United States Patent
Yoon

(10) Patent No.: US 12,461,162 B2
(45) Date of Patent: Nov. 4, 2025

(54) APPARATUS AND METHOD FOR CALCULATING BATTERY RESISTANCE

(71) Applicant: LG ENERGY SOLUTION, LTD., Seoul (KR)

(72) Inventor: Ho Byung Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 113 days.

(21) Appl. No.: 18/017,814

(22) PCT Filed: Aug. 6, 2021

(86) PCT No.: PCT/KR2021/010384
§ 371 (c)(1),
(2) Date: Jan. 24, 2023

(87) PCT Pub. No.: WO2022/065676
PCT Pub. Date: Mar. 31, 2022

(65) Prior Publication Data
US 2023/0280409 A1    Sep. 7, 2023

(30) Foreign Application Priority Data
Sep. 22, 2020 (KR) .................. 10-2020-0122615

(51) Int. Cl.
*G01R 31/389* (2019.01)
*G01R 31/3842* (2019.01)
*G01R 31/396* (2019.01)

(52) U.S. Cl.
CPC ....... *G01R 31/389* (2019.01); *G01R 31/3842* (2019.01); *G01R 31/396* (2019.01)

(58) Field of Classification Search
CPC . G01R 31/389; G01R 31/396; G01R 31/3842
See application file for complete search history.

(56) References Cited

U.S. PATENT DOCUMENTS

| 9,678,028 B2 | 6/2017 | Eyssler |
| 2006/0017444 A1 | 1/2006 | Fechalos et al. |

(Continued)

FOREIGN PATENT DOCUMENTS

| CN | 105137378 A | 12/2015 |
| CN | 206096402 U | 4/2017 |

(Continued)

OTHER PUBLICATIONS

Extended European Search Report for European Application No. 21872708.9, dated Nov. 30, 2023.

(Continued)

*Primary Examiner* — Minh Q Phan
(74) *Attorney, Agent, or Firm* — Birch, Stewart, Kolasch & Birch, LLP

(57) ABSTRACT

An apparatus for calculating battery resistance according to an embodiment of the present invention can include a measurement circuit connected between one terminal among a positive (+) terminal and a negative (−) terminal of a battery pack and a chassis, a voltage measurement unit that measures a voltage from the measurement circuit, and an insulation resistance calculation unit that calculates insulation resistance of the battery pack based on the voltage measured by the voltage measurement unit. When the calculated insulation resistance is less than a preset threshold, the insulation resistance calculation unit can recalculate the insulation resistance based on an amount of change in voltage of the battery pack over time.

15 Claims, 9 Drawing Sheets

(56) References Cited

U.S. PATENT DOCUMENTS

| | | |
|---|---|---|
| 2009/0226769 A1 | 9/2009 | Ota |
| 2012/0223734 A1 | 9/2012 | Takada et al. |
| 2013/0308230 A1 | 11/2013 | Ando et al. |
| 2016/0107525 A1* | 4/2016 | Min .................. B60L 3/0046 701/29.2 |
| 2016/0200209 A1 | 7/2016 | Tabatowski-Bush et al. |
| 2016/0214484 A1 | 7/2016 | Gale et al. |
| 2016/0377670 A1 | 12/2016 | Tamida et al. |
| 2017/0113553 A1 | 4/2017 | Gale et al. |
| 2017/0328940 A1 | 11/2017 | Choi |
| 2018/0340971 A1 | 11/2018 | Tamida et al. |
| 2019/0219640 A1 | 7/2019 | Liu et al. |
| 2019/0237815 A1 | 8/2019 | Dan et al. |
| 2020/0088803 A1 | 3/2020 | Park et al. |
| 2021/0293896 A1 | 9/2021 | Kubokawa et al. |
| 2022/0003823 A1 | 1/2022 | Lee |
| 2022/0043068 A1 | 2/2022 | Lee et al. |

FOREIGN PATENT DOCUMENTS

| | | |
|---|---|---|
| CN | 107870301 A | 4/2018 |
| CN | 109884391 A | 6/2019 |
| CN | 109997047 A | 7/2019 |
| JP | 2008-304290 A | 12/2008 |
| JP | 2010-19603 A | 1/2010 |
| JP | 2014-508939 A | 4/2014 |
| JP | 2014-81267 A | 5/2014 |
| JP | 5552218 B2 | 7/2014 |
| JP | 5577379 B2 | 8/2014 |
| KR | 10-2015-0081988 A | 7/2015 |
| KR | 10-2016-0046420 A | 4/2016 |
| KR | 10-1610906 B1 | 4/2016 |
| KR | 10-2016-0110184 A | 9/2016 |
| KR | 10-1984326 B1 | 9/2019 |
| KR | 10-2020-0039215 A | 4/2020 |
| KR | 10-2020-0084517 A | 7/2020 |
| WO | WO 2015/076075 A1 | 5/2015 |
| WO | WO 2020/116133 A1 | 6/2020 |

OTHER PUBLICATIONS

International Search Report (PCT/ISA/210) issued in PCT/KR2021/010384 mailed on Nov. 25, 2021.
Yanqi et al., "Basic Experiments in Electrical Engineering," Habei Electromechanical School, Machinery Industry Press, Oct. 1999, p. 90 (7 pages total), with English translation.

* cited by examiner (a)                  (b)

(a) (b)

APPARATUS AND METHOD FOR CALCULATING BATTERY RESISTANCE

CROSS-REFERENCE TO RELATED APPLICATIONS

This application claims the benefit of Korean Patent Application No. 10-2020-0122615 filed on Sep. 22, 2020, in the Korean Intellectual Property Office, the disclosure of which is incorporated herein in its entirety by reference.

TECHNICAL FIELD

The present invention is intended to provide an apparatus and method for calculating battery resistance for calculating insulation resistance of a battery.

BACKGROUND ART

Recently, research and development on a secondary battery are being actively conducted. Here, the secondary battery is a battery capable of charging and discharging, and is meant to include all of a conventional Ni/Cd battery, Ni/MH battery, etc. and a recent lithium ion battery. Among the secondary batteries, the lithium ion battery has an advantage of having much higher energy density compared to the conventional Ni/Cd battery, Ni/MH battery, etc. In addition, the lithium ion battery can be manufactured in a small size and light weight, and thus the lithium ion battery is used as a power source for a mobile device. In addition, the lithium ion battery is attracting attention as a next-generation energy storage medium as its range of use has been expanded to a power source for an electric vehicle.

In addition, the secondary battery is generally used as a battery pack including a battery module in which a plurality of battery cells are connected in series and/or in parallel. In addition, a state and operation of the battery pack are managed and controlled by a battery management system.

In particular, in the high-voltage battery packs used in energy storage systems (ESS) and electric vehicles, a certain level of insulation should be maintained between the battery pack and the chassis in order to prevent the battery pack from being discharged or an electric shock to the user. Accordingly, the battery management system (BMS) performs an insulation resistance measurement function between the battery pack and the chassis through an insulation resistance measurement circuit.

Conventionally, a method for calculating resistance by respectively connecting measurement resistors between two poles (+, −) of the battery pack and a chassis in order to measure insulation resistance, sequentially connecting the two poles of the battery pack and the chassis through a switch, and then measuring a voltage was used. However, a measurement resistor or a switching element included in an insulation resistance measurement circuit is connected between a high voltage battery and the chassis and clearance and creepage have to be taken into account, and thus bulky and expensive parts are mostly used. In particular, as a voltage of the battery pack increases, high-end components are required.

When considering the trend of gradually decreasing a volume and price of the battery management system, such an insulation resistance measurement circuit also needs a way to reduce the size and cost.

DISCLOSURE OF THE INVENTION

Technical Problem

The present invention is devised to solve the above problems, and an object thereof is to provide an apparatus and method for calculating battery resistance capable of reducing the size and cost of a battery management system by connecting a measurement circuit only between one terminal of a positive (+) terminal and a negative (−) terminal of a battery pack and a chassis.

In addition, an object of the apparatus and method for calculating battery resistance according to the present invention is to implement performance substantially equivalent to that of an existing measurement circuit even if one section of the measurement circuit is removed.

Technical Solution

An apparatus for calculating battery resistance according to an embodiment of the present invention includes a measurement circuit connected between one terminal among a positive (+) terminal and a negative (−) terminal of a battery pack and a chassis, a voltage measurement unit that measures a voltage from the measurement circuit, and an insulation resistance calculation unit that calculates insulation resistance of the battery pack based on the voltage measured by the voltage measurement unit, in which, when the calculated insulation resistance is less than a preset threshold, the insulation resistance calculation unit recalculates the insulation resistance based on an amount of change in voltage of the battery pack over time.

A method for calculating battery resistance according to an embodiment of the present invention includes measuring a voltage by connecting a measurement circuit between one terminal of a positive (+) terminal and a negative (−) terminal of a battery pack and a chassis, and calculating insulation resistance of the battery pack based on the measured voltage, in which, in the calculating insulation resistance of the battery pack, when the calculated insulation resistance is less than a preset threshold, the insulation resistance is recalculated based on an amount of change in voltage of the battery pack over time.

Advantageous Effects

According to the apparatus and method for calculating battery resistance according to the present invention, it is possible to reduce the size and cost of the battery management system by connecting the measurement circuit only between one terminal of the positive (+) terminal and the negative (−) terminal of the battery pack and the chassis.

According to the apparatus and method for calculating battery resistance according to the present invention, it is possible to implement performance substantially equivalent to that of an existing measurement circuit even if one section of the measurement circuit is removed.

MODE FOR CARRYING OUT THE INVENTION

Figure 1:
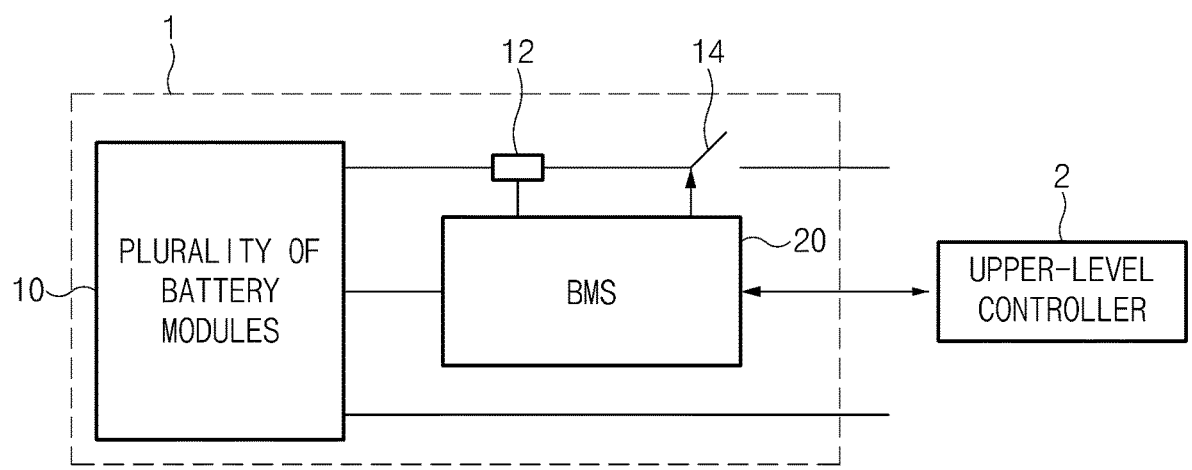
FIG. 1 is a block diagram illustrating a configuration of a general battery pack.

Hereinafter, various embodiments of the present invention will be described in detail with reference to the accompanying drawings. In this document, the same reference numerals are used for the same constituent elements in the drawings, and duplicate descriptions for the same constituent elements are omitted.

With respect to the various embodiments of the present invention disclosed in this document, specific structural or functional descriptions have been exemplified for the purpose of describing the embodiments of the present invention only, and various embodiments of the present invention may be embodied in various forms and should not be construed as being limited to the embodiments described in this document.

Expressions such as "first", "second", "firstly", or "secondly", etc. used in various embodiments may modify various constituent elements regardless of order and/or importance, and do not limit corresponding constituent elements. For example, without deviating from the scope of the present invention, a first constituent element may be named as a second constituent element, and similarly, the second constituent element may also be renamed as the first constituent element.

The terms used in this document are only used to describe a specific embodiment, and may not be intended to limit the scope of other embodiments. Singular expressions may include plural expressions unless they are clearly meant differently in the context.

All terms used herein, including technical or scientific terms, may have the same meaning as generally understood by a person having an ordinary skill in the technical field of the present invention. Terms defined in a generally used dictionary may be interpreted as having the same or similar meaning as the meaning in the context of the related technology, and are not to be interpreted as an ideal or excessively formal meaning unless explicitly defined in this document. In some cases, even terms defined in this document cannot be interpreted to exclude embodiments of the present invention.

FIG. 1 is a block diagram illustrating a configuration of a battery control system.

Referring to FIG. 1, a battery management system including a battery pack 1 according to an embodiment of the present invention and an upper-level controller 2 included in an upper-level system is schematically illustrated.

As illustrated in FIG. 1, the battery pack 1 includes a battery module 10 composed of one or more battery cells and capable of charging and discharging, a switching unit 14 connected in series to a positive terminal side or a negative terminal side of the battery module 10 to control a charge and discharge current flow of the battery module 10, and a battery management system 20 (e.g., BMS) that monitors a voltage, current, temperature, etc. of the battery pack 1 to control and manage the battery module 10 to prevent overcharging, over-discharging, etc.

Here, the switching unit 14 is a semiconductor switching element for controlling a current flow for charging or discharging of the battery module 10, and, for example, at least one MOSFET, a relay, a magnetic contactor, etc. may be used according to the specifications of the battery pack 1.

In addition, the battery management system 20 may measure or calculate a voltage and current of a gate, source, and drain of the semiconductor switching element in order to monitor the voltage, current, temperature, etc. of the battery pack 1. In addition, the battery management system 20 may measure the current of the battery pack 1 using a sensor 12 provided adjacent to the semiconductor switching element. Here, the sensor 12 may correspond to a voltage measurement unit to be described later.

The battery management system 20 is an interface that receives values obtained by measuring various parameters described above, and may include a plurality of terminals and a circuit connected to these terminals to perform processing for input values. In addition, the battery management system 20 may control ON/OFF of the switching unit 14, for example, a MOSFET, and may be connected to the battery module 10 to monitor a state of each battery module 10.

Meanwhile, in the battery management system 20 of the present invention, the insulation resistance of the battery pack 1 may be calculated through a resistance calculation program based on data measured using the measurement circuit connected to the battery pack 1 as described below.

The upper-level controller 2 may transmit a control signal for the battery module 10 to the battery management system 20. Accordingly, an operation of the battery management system 20 may be controlled based on a signal applied from the upper-level controller. Meanwhile, the battery cell of the present invention may be configured to be included in a battery pack used in a vehicle or an energy storage system (ESS), etc. For example, the upper-level controller 2 may be an ESS controller. However, the battery pack 1 is not necessarily limited to these uses.

Since the configuration of the battery pack 1 and the configuration of the BMS 20 are known configurations, a more detailed description thereof will be omitted.

Figure 2:
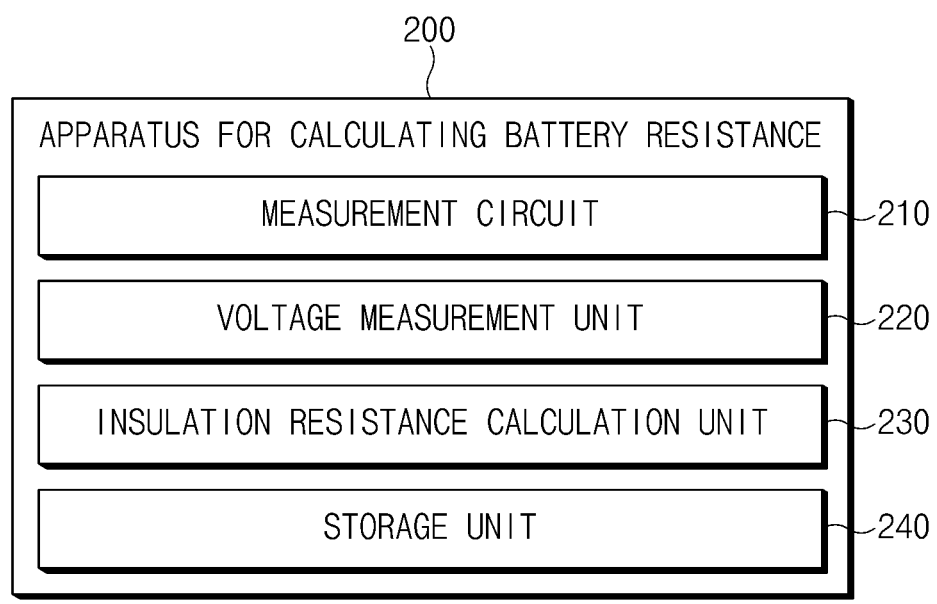
FIG. 2 is a block diagram illustrating a configuration of an apparatus for calculating battery resistance according to an embodiment of the present invention.

FIG. 2 is a block diagram illustrating a configuration of an apparatus for calculating battery resistance according to an embodiment of the present invention.

Referring to FIG. 2, an apparatus for calculating battery resistance 200 according to an embodiment of the present invention may include a measurement circuit 210, a voltage measurement unit 220, an insulation resistance calculation unit 230, and a storage unit 240. For example, the apparatus for calculating battery resistance 200 illustrated in FIG. 2 may be a configuration included in the battery management system (BMS) of the battery pack.

The measurement circuit 210 may be connected between one of the positive (+) terminal and the negative (−) terminal of the battery pack and the chassis. For example, the chassis connected to the measurement circuit 210 may include a chassis provided in a vehicle.

In addition, the measurement circuit 210 may include a measurement resistor and a switch connected in series, and may be connected in parallel to an insulation resistor of the battery pack. In addition, the measurement circuit 210 may further include a voltage division resistor connected in parallel to the measurement resistor and the switch. For example, the measurement resistor and the switch of the voltage measurement unit 220 may be respectively connected in parallel to the insulation resistors of the battery pack, and the voltage division resistor may be connected in parallel to one of the insulation resistors. In addition, the voltage division resistor may serve to distribute the voltage of the measurement circuit 210 to adjust the voltage to a measurable level.

The voltage measurement unit 220 may measure the voltage from the measurement circuit. For example, the voltage measurement unit 220 may be a sensor of the battery management system connected to the voltage division resistor side of the measurement circuit 210.

The insulation resistance calculation unit 230 may calculate the insulation resistance of the battery pack based on the voltage measured by the voltage measurer 220. In this case, the insulation resistance calculation unit 230 may calculate the insulation resistance of the battery pack using at least one equivalent circuit according to a switching state of the switch included in the measurement circuit 210. This will be described later with reference to FIG. 4B.

In addition, when the calculated insulation resistance is less than a preset threshold (e.g., 100 kg), the insulation resistance calculation unit 230 may recalculate the insulation resistance based on an amount of change in voltage of the battery pack over time. When the measurement circuit 210 is provided on only one terminal of the positive (+) or negative (−) terminal of the battery pack like the apparatus for calculating battery resistance 200 according to an embodiment of the present invention, accuracy may be lowered for insulation resistance less than a certain value due to asymmetry. Accordingly, in the apparatus for calculating battery resistance 200 according to an embodiment of the present invention, the insulation resistance is recalculated through a separate method for a calculated insulation resistance value less than a threshold in consideration of this limitation.

Specifically, when the calculated insulation resistance value is less than the preset threshold, the insulation resistance calculation unit 230 may recalculate the insulation resistance by calculating an amount of change in capacity of the battery pack using the amount of change in voltage of the battery pack over time. In this case, the insulation resistance calculation unit 230 may calculate the amount of change in capacity of the battery pack based on, for example, an OCV-SOC table pre-stored in the storage unit 240.

In addition, the insulation resistance calculation unit 230 may calculate a leakage current from the amount of change in capacity of the battery pack, and recalculate the insulation resistance based on the amount of change in voltage of the battery pack over time and the leakage current.

For example, when the calculated insulation resistance is less than the preset threshold, the insulation resistance calculation unit 230 may recalculate the insulation resistance based on a voltage difference between the voltage at the point in time when the previous driving of the battery pack is completed (e.g., the point in time when previous starting of the vehicle is turned off) and the voltage at the point in time before the driving of the battery pack starts (e.g., the point in time when starting of the vehicle is turned on).

In addition, when the calculated insulation resistance is less than the preset threshold, the insulation resistance calculation unit 230 may recalculate the insulation resistance based on the voltage difference between the voltage at the point in time when the previous driving of the battery pack is completed and the voltage of the battery pack that is woken up by the battery management system after a preset time has elapsed from the point in time when the previous driving of the battery pack is completed. In this case, the preset time from the point in time when the previous driving of the battery pack is completed may be measured through a real-time clock (RTC).

As described above, there may be various methods for the insulation resistance calculation unit 230 to recalculate the insulation resistance when the insulation resistance is less than the preset threshold, and an exemplary process thereof will be described in detail later in FIG. 5.

The storage unit 240 may store various data such as voltage data measured by the voltage measurement unit 220, insulation resistance data calculated based on the voltage data, a change in capacity of the battery pack, and a leakage current value, etc. In addition, the storage unit 240 may store the open circuit voltage (OCV)—state of charge (SOC) table. However, the apparatus for calculating battery resistance 200 according to an embodiment of the present invention does not necessarily include the storage unit 240, and may be configured to include a communication unit and transmit and receive data from a database of an external server through the communication unit.

Meanwhile, in FIG. 2, the apparatus for calculating battery resistance according to an embodiment of the present invention may further include an alarm unit. The alarm unit may provide a warning alarm to the user when the insulation resistance calculated by the insulation resistance calculation unit 230 is out of a preset reference range. For example, the alarm unit may provide a warning alarm to the user in various ways, such as providing a warning notification as a visual signal through a lamp or generating a warning notification sound or message through a speaker. Accordingly, it is possible to protect the user from the risk of electric shock or the like occurring due to the insulation resistor.

As described above, according to the apparatus for calculating battery resistance according to an embodiment of the present invention, the battery management system size can be reduced and costs can be reduced by connecting the measurement circuit 210 only between one terminal of the positive (+) terminal and the negative (−) terminal of the battery pack and the chassis. In addition, according to the apparatus for calculating battery resistance according to an embodiment of the present invention, even if one section of the measurement circuit 210 is removed, performance substantially equivalent to that of the existing measurement circuit can be implemented.

Figure 3A:
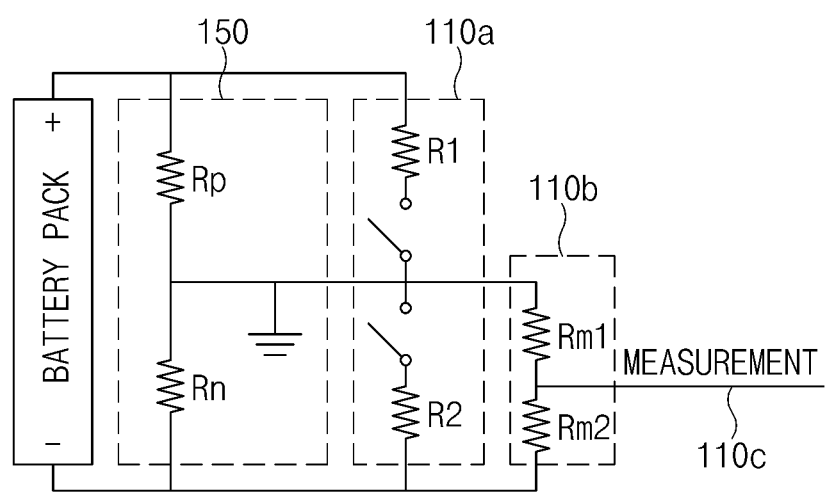
FIG. 3A is a diagram illustrating calculation of insulation resistance in a conventional battery pack.

FIG. 3A is a diagram illustrating calculation of insulation resistance in a conventional battery pack. In addition, FIG. 3B is a diagram illustrating an equivalent circuit for calculating insulation resistance in a conventional battery pack.

Referring to FIG. 3A, $R_p$ and $R_n$ 150 indicate the insulation resistors of the battery pack, $R_1$ and $R_2$ indicate the measurement resistors and a switch 110a of the measurement circuit, and $R_{m1}$ and $R_{m2}$ indicate a voltage division resistor 110b. In addition, a voltage measurement terminal 110c is provided between the resistors $R_{m1}$ and $R_{m2}$.

As illustrated in FIG. 3A, conventionally, the voltage of the battery pack was measured by connecting the measurement resistor and the switch 110a to both the positive (+) terminal and negative (−) terminal of the battery pack, and sequentially connecting $R_1$ and $R_2$ by alternately controlling on/off of the switches of both terminals.

Figure 3B:
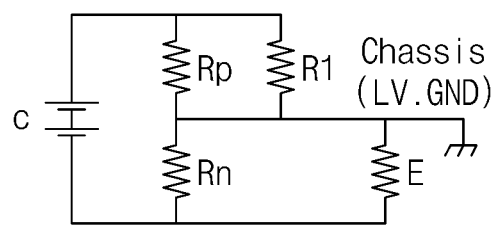
FIG. 3B is a diagram illustrating an equivalent circuit for calculating the insulation resistance in the conventional battery pack.
Figure 3B:
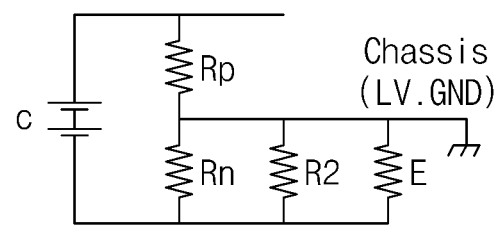

Specifically, referring to FIG. 3B, an equivalent circuit for measuring a voltage by alternately turning on or off the switch on the measurement resistor $R_1$ side and the switch on the measurement resistor $R_2$ side of FIG. 3A is illustrated. As such, for (a) and (b) of FIG. 3B, a value measured at the voltage measurement terminal 110c and a formula for calculating the insulation resistance can be summarized and expressed as follows.

$$\frac{(R_n \parallel E)}{(R_n \parallel E) + (R_p \parallel R_1)} \times C \times D = A \qquad [\text{Equation 1}]$$

$$\frac{(R_n \parallel E) \parallel R_2}{(R_n \parallel E) \parallel R_2 + R_p} \times C \times D = B \qquad [\text{Equation 2}]$$

(where $R_p$ and $R_n$ indicate insulation resistances on the positive (+) side and negative (−) side of the battery pack, respectively, $R_1$ and $R_2$ indicate the measurement resistors of the measurement circuit, E indicates ($R_{m1}$+$R_{m2}$), C indicates a battery pack voltage, and D indicates $R_{m2}$/($R_{m1}$+$R_{m2}$), A indicates a voltage on the terminal measurement side of the equivalent circuit (a), and B indicates the voltage on the measurement terminal side of the equivalent circuit (b)).

By summarizing Equations 1 and 2, the insulation resistance can be calculated as follows.

$$R_p = \frac{R_1(A - B)}{B} \qquad [\text{Equation 3}]$$

$$R_n = \frac{A \cdot E \cdot R_1 \cdot R_p}{E \cdot (R_p + G) \cdot (C \cdot D - A) - A \cdot R_1 \cdot R_p}$$

As such, according to the conventional insulation resistance calculation method, the insulation resistance can be calculated relatively accurately, but it is inevitable that the size of the measurement circuit increases and the cost is high due to the measurement resistor, the switch, etc. Accordingly, as described below, in the apparatus for calculating battery resistance according to an embodiment of the present invention, the insulation resistance may be calculated by omitting the measurement resistor and the switch provided at one end of the battery pack.

Figure 4A:
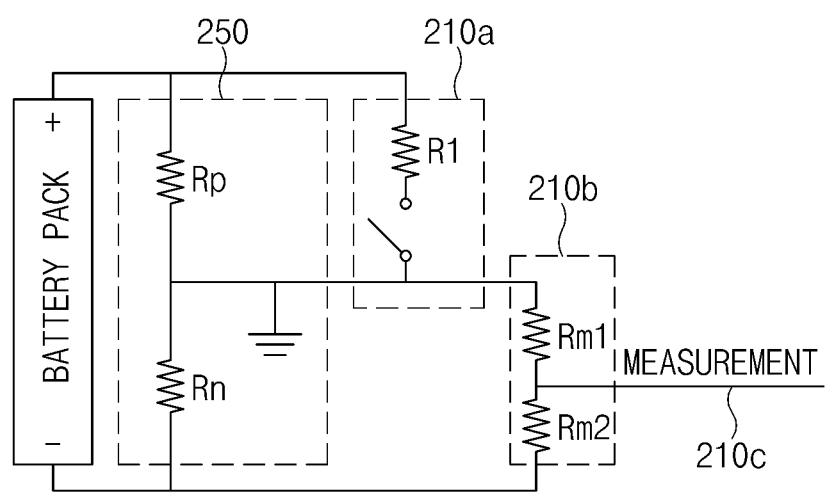
FIG. 4A is a diagram illustrating calculation of insulation resistance of a battery pack using the apparatus for calculating battery resistance according to the embodiment of the present invention.

FIG. 4A is a diagram illustrating calculation of insulation resistance of the battery pack using the apparatus for calculating battery resistance according to an embodiment of the present invention. In addition, FIG. 4B is a diagram illustrating an equivalent circuit for calculating the insulation resistance of the battery pack using the apparatus for calculating battery resistance according to an embodiment of the present invention.

Referring to FIG. 4A, similarly as in FIG. 3A, $R_p$ and $R_n$ 250 indicate the insulation resistances of the battery pack, $R_1$ indicates the measurement resistor and a switch 210a of the measurement circuit, and $R_1$ and $R_2$ indicate a voltage division resistor 210b. A measurement terminal 210c is provided between the resistors $R_{m1}$ and $R_{m2}$.

As illustrated in FIG. 4A, in the apparatus for calculating battery resistance according to an embodiment of the present invention, the voltage of the battery pack can be measured by connecting the measurement resistor and the switch 210a to only one terminal of the positive (+) terminal and the negative (−) terminal of the battery pack, and controlling on/off of the switch to connect or disconnect $R_1$.

Figure 4B:
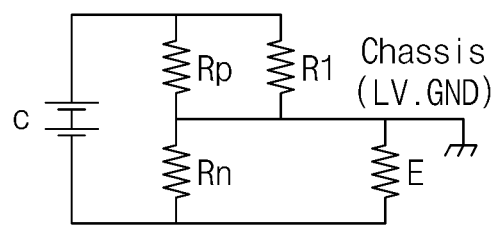
FIG. 4B is a diagram illustrating an equivalent circuit for calculating the insulation resistance of the battery pack using the apparatus for calculating battery resistance according to the embodiment of the present invention.
Figure 4B:
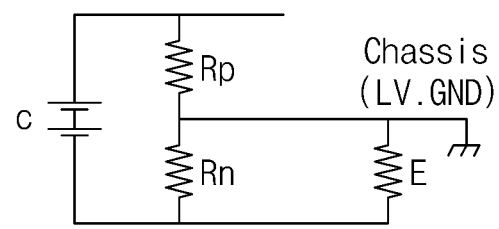

Specifically, referring to FIG. 4B, an equivalent circuit for measuring a voltage by controlling on/off of the switch on the measurement resistor $R_1$ side of FIG. 4A is illustrated. As such, for (a) and (b) of FIG. 4B, the value measured at the voltage measurement terminal 210c and the calculation formula of the insulation resistance can be summarized and expressed as follows.

$$\frac{(R_n \parallel E)}{(R_n \parallel E) + (R_p \parallel R_1)} \times C \times D = A \qquad [\text{Equation 4}]$$

$$\frac{(R_n \parallel E)}{(R_n \parallel E) + R_p} \times C \times D = B \qquad [\text{Equation 5}]$$

(where $R_p$ and $R_n$ indicate insulation resistances on the positive (+) side and negative (−) side of the battery pack, respectively, $R_1$ and $R_2$ indicate the measurement resistors of the measurement circuit, E indicates ($R_{m1}$+$R_{m2}$), C indicates a battery pack voltage, and D indicates $R_{m2}$/($R_{m1}$+$R_{m2}$), A indicates a voltage on the terminal measurement side of the equivalent circuit (a), and B indicates the voltage on the measurement terminal side of the equivalent circuit (b)).

By summarizing Equations 4 and 5, the insulation resistance can be calculated as follows.

$$R_p = \frac{C \cdot D \cdot R_1(A - B)}{B \cdot (C \cdot D - A)} \qquad [\text{Equation 6}]$$

$$R_n = \frac{A \cdot E \cdot R_1 \cdot R_p}{E \cdot (R_p + G) \cdot (C \cdot D - A) - A \cdot R_1 \cdot R_p}$$

As such, according to the apparatus for calculating battery resistance according to an embodiment of the present invention, it is possible to reduce the size and cost of the battery management system by connecting the measurement circuit only between one terminal of the positive (+) or negative (−) terminal of the battery pack and the chassis. In addition, according to the method for calculating battery resistance according to an embodiment of the present invention, even if one section of the measurement circuit is removed, it is possible to implement performance substantially equivalent to that of the existing measurement circuit.

However, since the measurement circuit for one of the positive (+) terminal and negative (+) terminal of the battery pack is omitted in the apparatus for calculating battery resistance according to an embodiment of the present invention, there is a problem in that the measurement accuracy is lower than that of the conventional method due to asymmetry of a circuit. This problem is mainly conspicuous as the calculated insulation resistance value becomes smaller. In order to improve measurement accuracy for such a small insulation resistance, when the calculated insulation resistance is less than a threshold (e.g., 100 kΩ), the insulation resistance can be recalculated by measuring the voltage of the battery pack for a certain period of time and calculating the leakage current. This will be described below.

Figure 5:
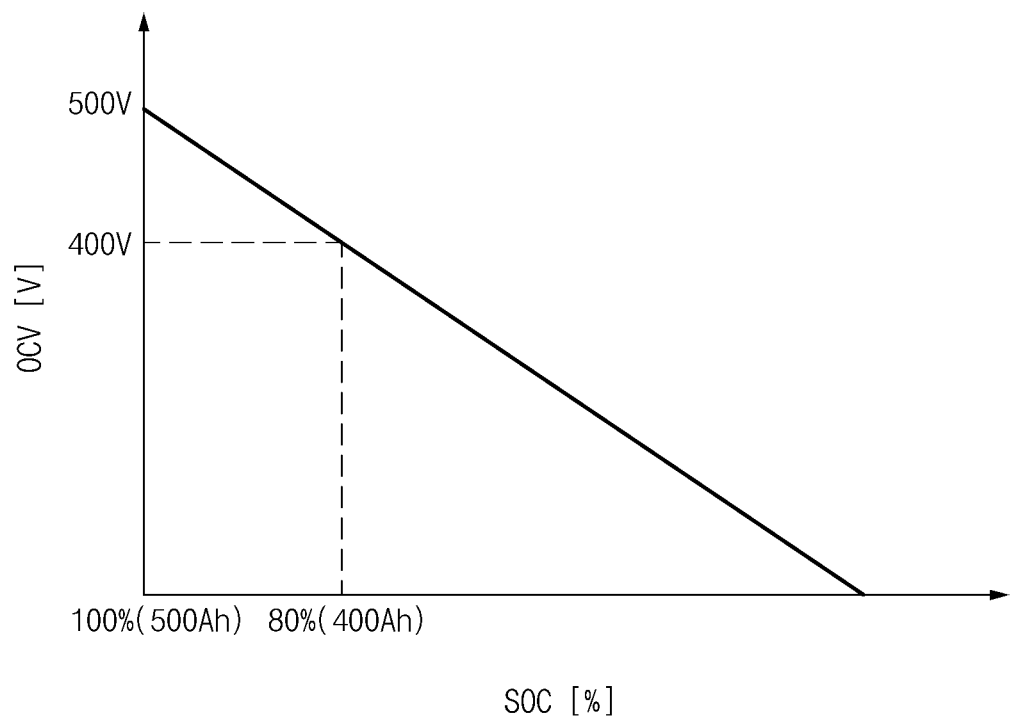
FIG. 5 is a diagram illustrating an OCV-SOC table (graph) of the battery pack for calculating insulation resistance in the apparatus for calculating battery resistance according to the embodiment of the present invention.

FIG. 5 is a diagram illustrating an OCV-SOC table (graph) of the battery pack for calculating insulation resistance in the apparatus for calculating battery resistance according to the embodiment of the present invention. In FIG. 5, the x-axis represents state of charge (SOC) (%), and the y-axis represents open circuit voltage (OCV) (V).

In FIG. 5, a case in which the calculated insulation resistance is less than a preset threshold will be described. For example, in the case of a battery pack mounted on a vehicle, it is assumed that a battery pack voltage $V_1$ measured at the point in time when starting of the vehicle is turned off is 500 V, and a battery pack voltage $V_2$ measured the point in time when starting of the vehicle is turned on again is 400 V.

In this case, referring to the OCV-SOC table illustrated in FIG. 5, it can be seen that an amount of change in capacity of the battery pack is 100 Ah for a total of 500 Ah. In addition, if the time Δt during which the vehicle is parked is 100 hours, it can be seen that a leakage current i of the battery is 100 Ah/100 h=1 A because amount of change in capacity of battery/amount of change in time. In this way, when calculated based on an amount of change in voltage $(V_1-V_2)$ of the battery pack and the leakage current i, the insulation resistance may be calculated as 100V/1 A=100Ω.

Meanwhile, in FIG. 5, although the battery pack voltage difference between the point in time when starting of the vehicle was turned off and the point in time when starting of the vehicle is turned on again was calculated, even for a case where the vehicle is parked before starting of the vehicle is turned on, the insulation resistance can be calculated in the same manner as described above even for the case the battery pack is woken up after a predetermined time has elapsed using the RTC.

Figure 6:
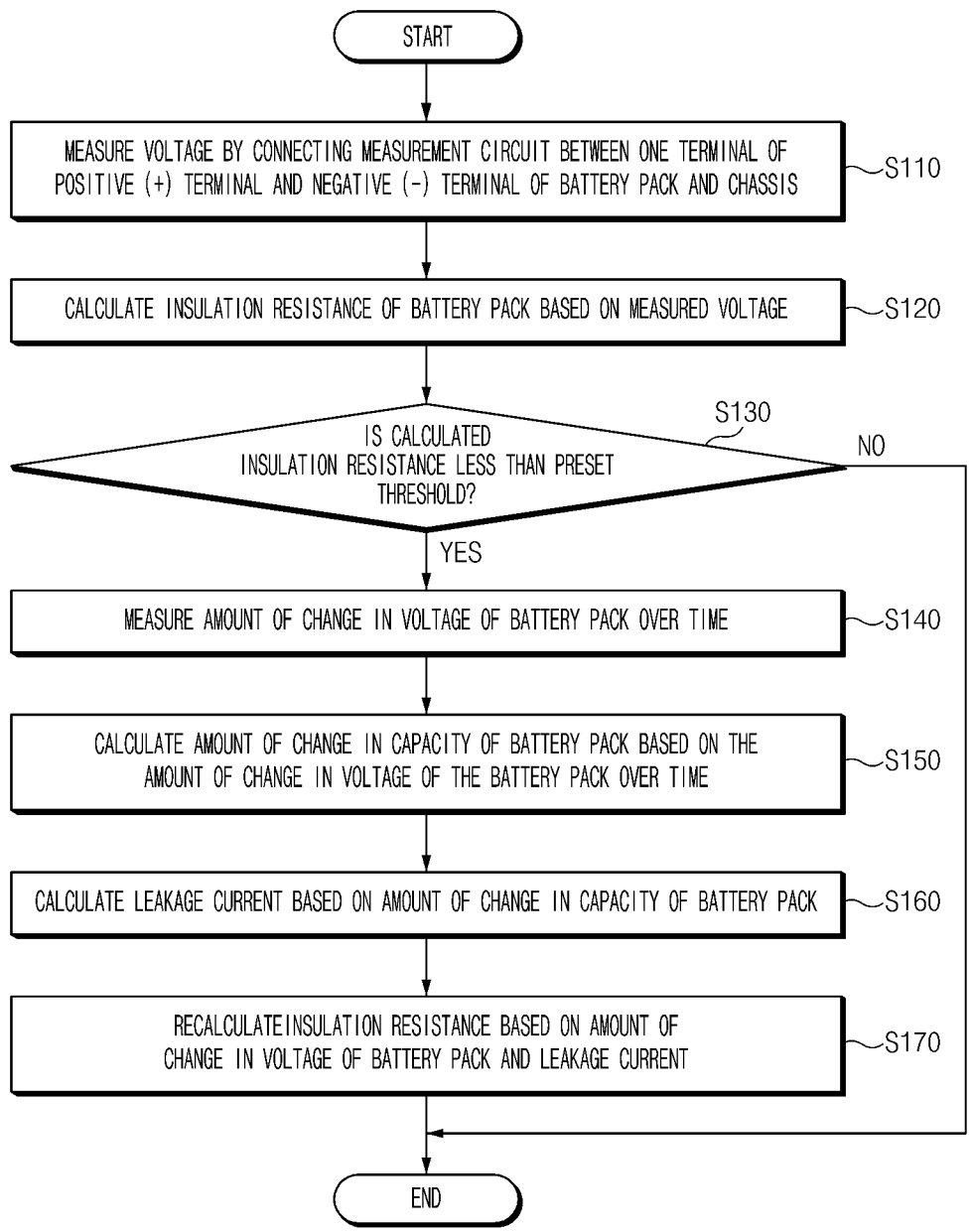
FIG. 6 is a flowchart illustrating a method for calculating battery resistance according to an embodiment of the present invention.

FIG. 6 is a flowchart illustrating a method for calculating battery resistance according to an embodiment of the present invention.

Referring to FIG. 6, a voltage is measured by first connecting a measurement circuit between one terminal of the positive (+) terminal and negative (−) terminal of the battery pack and the chassis (S110). For example, the measurement circuit in step S110 may include a measurement resistor and a switch, and may further include a voltage division resistor.

Then, insulation resistance of the battery pack is calculated based on a measured voltage (S120). In this case, in step S120, the insulation resistance of the battery pack may be calculated using at least one equivalent circuit according to a switching state of the switch included in the measurement circuit. Since this has been described with reference to FIGS. 4A and 4B, a detailed description thereof will be omitted.

Next, it is determined whether the calculated insulation resistance is less than a preset threshold (e.g., 10 kΩ) (S130). If the insulation resistance is equal to or greater than the threshold (NO), the calculated insulation resistance is determined as a final value.

On the other hand, when the calculated insulation resistance is less than the preset threshold (YES), the insulation resistance may be recalculated based on an amount of change in voltage of the battery pack over time. Specifically, first, an amount of change in voltage of the battery pack over time is measured (S140). In this case, as the amount of change in voltage of the battery pack over time, an amount of change in voltage between the point in time when the previous operation of the battery pack is completed and the point in time when the next operation starts, an amount of change in voltage between the point in time when the previous operation of the battery pack is completed and the point in time when the battery pack wakes up after a certain period of time from the completion of the previous operation of the battery pack, etc. can be measured.

Then, the amount of change in capacity of the battery pack is calculated based on the amount of change in voltage of the battery pack over time (S150). In this case, in step S150, the amount of change in capacity of the battery pack may be calculated based on the pre-stored OCV-SOC table.

In addition, the leakage current is calculated based on the calculated amount of change in capacity of the battery pack (S160). Then, the insulation resistance is recalculated based on the amount of change in voltage of the battery pack calculated in step S140 and the leakage current calculated in step S160 (S170).

As such, in the apparatus for calculating battery resistance according to an embodiment of the present invention, since the measurement circuit is provided on only one terminal of the positive (+) and the negative (−) terminal of the battery pack, accuracy may be lowered for insulation resistance less than a certain value due to asymmetry. Accordingly, in the method for calculating battery resistance according to an embodiment of the present invention, more accurate insulation resistance can be recalculated through the method illustrated in steps S140 to S170 for the calculated insulation resistance value less than the threshold value in consideration of this limitation.

As such, according to the method for calculating battery resistance according to an embodiment of the present invention, it is possible to reduce the size and cost of a battery management system by connecting a measurement circuit only between one terminal of the positive (+) terminal and the negative (−) terminal of the battery pack and the chassis. In addition, according to the method for calculating battery resistance according to an embodiment of the present invention, even if one section of the measurement circuit is removed, it is possible to implement performance substantially equivalent to that of the existing measurement circuit.

Figure 7:
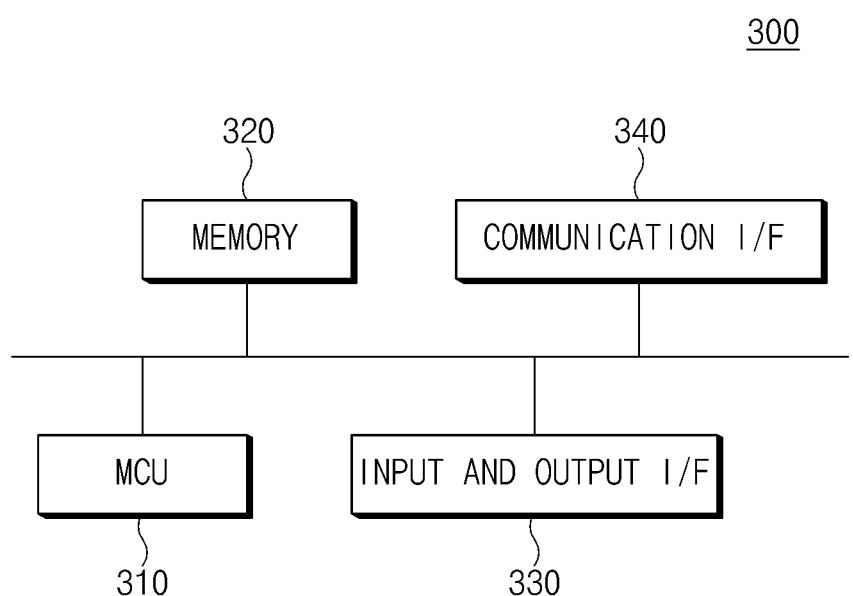
FIG. 7 is a block diagram illustrating a hardware configuration of the apparatus for calculating battery resistance according to the embodiment of the present invention.

FIG. 7 is a block diagram illustrating a hardware configuration of the apparatus for calculating battery resistance according to the embodiment of the present invention.

Referring to FIG. 7, an apparatus for calculating battery resistance 300 according to an embodiment of the present invention may include an MCU 310, a memory 320, an input and output I/F 330, and a communication I/F 340.

The MCU 310 may be a processor that executes various programs (e.g., battery voltage measurement program, battery insulation resistance calculation program, etc.) stored in the memory 320, processes various data for calculating the insulation resistance of the battery pack through these programs, and performs the functions of FIG. 2 described above.

The memory 320 may store various programs related to voltage measurement of battery cells, calculation of insulation resistance, etc. In addition, the memory 320 may store various data such as the measured voltage of the battery, insulation resistance data, amount of change in capacity, leakage current value, OCV-SOC table, etc.

A plurality of these memories 320 may be provided as needed. The memory 320 may be a volatile memory or a non-volatile memory. As the memory 320 as the volatile memory, a RAM, a DRAM, an SRAM, etc. may be used. As the memory 320 as the non-volatile memory, a ROM, a PROM, an EAROM, an EPROM, an EEPROM, a flash memory, etc. may be used. Examples of the memories 320 listed above are merely examples and are not limited to these examples.

The input and output I/F 330 may provide an interface for transmitting and receiving data by connecting an input device (not illustrated) such as a keyboard, a mouse, and a touch panel, and an output device such as a display (not illustrated), and the MCU 310.

The communication I/F 340 is a configuration capable of transmitting and receiving various data with a server, and may be various devices capable of supporting wired or wireless communication. For example, a program or various data for voltage measurement and insulation resistance calculation of the battery pack may be transmitted and received to and from an external server provided separately through the communication I/F 340.

As such, a computer program according to an embodiment of the present invention may be implemented as a module that is recorded in a memory and processed by an MCU, for example, performing each functional block illustrated in FIG. 2.

In the above description, just because all constituent elements constituting an embodiment of the present invention are described as being combined into one or operating in combination, the present invention is not necessarily limited to the embodiment. That is, as long as it is within the scope of the object of the present invention, all constituent elements may be selectively combined and operated in one or more.

In addition, the terms such as "include", "configure" or "have" described above mean that the corresponding constituent element may be embedded unless otherwise particularly described, and thus the terms should be interpreted as being capable of further including other constituent elements, rather than excluding other constituent elements. All terms used herein including technical or scientific terms may have the same meaning as generally understood by a person having an ordinary skill in the technical field to which the present invention pertains, unless otherwise defined. Terms generally used, such as terms defined in the dictionary, should be interpreted as being consistent with the meaning of the context of related technology, and are not to be interpreted as an ideal or excessively formal meaning unless explicitly defined in the present invention.

The above description is merely illustrative of the technical idea of the present invention, and those having ordinary skill in the art to which the present invention pertains will be able to make various modifications and variations thereto in a range without deviating from the essential characteristics of the present invention. Accordingly, the embodiments disclosed in the present invention are not intended to limit the technical idea of the present invention, but to explain the technical idea, and the scope of the technical idea of the present invention is not limited by these embodiments. The scope of protection of the present invention should be interpreted by the claims set forth below, and all technical ideas within the scope equivalent thereto should be construed as being included in the scope of rights of the present invention.

The invention claimed is:

1. An apparatus for calculating battery resistance, the apparatus comprising:
    a measurement circuit connected between one terminal among a positive (+) terminal and a negative (−) terminal of a battery pack and a chassis;
    a voltage measurement unit that measures a voltage from the measurement circuit; and
    an insulation resistance calculation unit that calculates insulation resistance of the battery pack based on the voltage measured by the voltage measurement unit,
    wherein, when a calculated insulation resistance is less than a preset threshold, the insulation resistance calculation unit recalculates the insulation resistance based on an amount of change in voltage of the battery pack over a certain period of time while the battery pack is not driven, and
    wherein the certain period of time is from a first point in time after a previous driving of the battery pack is completed to a second point in time before driving of the battery pack starts.

2. The apparatus of claim 1,
    wherein the measurement circuit includes a measurement resistor and a switch connected in series, and
    wherein the measurement resistor and the switch are connected in parallel to insulation resistors.

3. The apparatus of claim 2,
    wherein the measurement circuit further includes a voltage division resistor connected in parallel to one of the insulation resistors.

4. The apparatus of claim 1,
    wherein, when the calculated insulation resistance is less than the preset threshold, the insulation resistance calculation unit recalculates the insulation resistance by calculating an amount of change in capacity of the battery pack using the amount of change in the voltage of the battery pack over the certain period of time.

5. The apparatus of claim 4,
    wherein the insulation resistance calculation unit calculates a leakage current from the amount of change in the capacity of the battery pack, and recalculates the insulation resistance based on the amount of change in the voltage of the battery pack over the certain period of time and the leakage current.

6. The apparatus of claim 4,
    wherein the insulation resistance calculation unit calculates the amount of change in the capacity of the battery pack based on a pre-stored open circuit voltage-state of charge (OCV-SOC) table.

7. The apparatus of claim 1,
    wherein, when the calculated insulation resistance is less than the preset threshold, the insulation resistance calculation unit recalculates the insulation resistance based on a voltage difference between a voltage at the point in time when the previous driving of the battery pack is completed and a voltage at the point in time before the driving of the battery pack starts.

8. The apparatus of claim 1,
    wherein, when the insulation resistance is less than the preset threshold, the insulation resistance calculation unit recalculates the insulation resistance based on a voltage difference between a voltage at the point in time when the previous driving of the battery pack is completed and a voltage of the battery pack that wakes up after a preset time has elapsed from the point in time when the previous driving of the battery pack is completed.

9. The apparatus of claim 8,
    wherein the preset time from the point in time when the previous driving of the battery pack is completed is measured through a real-time clock (RTC).

10. The apparatus of claim 1, wherein the first point in time is when a previous starting of a vehicle is turned off.

11. The apparatus of claim 1, wherein the second point in time is when a starting of a vehicle is turned on.

12. A method for calculating battery resistance, the method comprising:
    measuring a voltage by connecting a measurement circuit between one terminal among a positive (+) terminal and a negative (−) terminal of a battery pack and a chassis; and calculating insulation resistance of the battery pack based on the measured voltage, wherein, in the calculating the insulation resistance of the battery pack, when the calculated insulation resistance is less than a preset threshold, the insulation resistance is recalculated based on an amount of change in voltage of the battery pack over a certain period of time while the battery pack is not driven, and wherein the certain period of time is from a first point in time after a previous driving of the battery pack is completed to a second point in time before driving of the battery pack starts.

13. The method of claim 12, wherein the first point in time is when a previous starting of a vehicle is turned off.

14. The method of claim 12, wherein the second point int time is when a starting of a vehicle is turned on.

15. An apparatus for calculating battery resistance, the apparatus comprising:
- a measurement circuit connected between one terminal among a positive (+) terminal and a negative (−) terminal of a battery pack and a chassis;
- a voltage measurement unit that measures a voltage from the measurement circuit; and
- an insulation resistance calculation unit that calculates insulation resistance of the battery pack based on the voltage measured by the voltage measurement unit, wherein, when a calculated insulation resistance is less than a preset threshold, the insulation resistance calculation unit recalculates the insulation resistance based on an amount of change in voltage of the battery pack over time, and wherein, when the calculated insulation resistance is less than the preset threshold, the insulation resistance calculation unit recalculates the insulation resistance based on one of:
- a voltage difference between a voltage at a point in time when a previous driving of the battery pack is completed and a voltage at a point in time before driving of the battery pack starts; or
- a voltage difference between the voltage at the point in time when the previous driving of the battery pack is completed and a voltage of the battery pack that wakes up after a preset time has elapsed from the point in time when the previous driving of the battery pack is completed.

\* \* \* \* \*